United States Patent [19]
Wegmann et al.

[11] Patent Number: 5,602,529
[45] Date of Patent: Feb. 11, 1997

[54] STRUCTURE-BORNE SOUND DETECTOR FOR AN INTRUDER ALARM SYSTEM

[75] Inventors: George Wegmann, Ebnat-Kappel; Cornel Studach, Hombrechtikon; Peter Märki, Stäfa; Peter Steiner, Jona; Peter Ryser, Stäfa, all of Switzerland

[73] Assignee: Cerberus AG, Mannedorf, Switzerland

[21] Appl. No.: 375,580

[22] Filed: Jan. 19, 1995

[30] Foreign Application Priority Data

Jan. 20, 1994 [CH]  Switzerland ............... 00172/94

[51] Int. Cl.⁶ .................................... G08B 13/00
[52] U.S. Cl. .................................... 340/566; 310/332
[58] Field of Search ................. 340/566; 310/332, 310/344; 73/652, 654; 381/56; 367/180

[56] References Cited

U.S. PATENT DOCUMENTS

| | | | |
|---|---|---|---|
| 4,197,479 | 4/1980 | Gudzin | 310/330 |
| 4,290,058 | 9/1981 | Bystricky | 340/566 |
| 4,678,957 | 7/1987 | Harnden, Jr. et al. | 310/332 |
| 4,698,541 | 10/1987 | Bar-Cohen | 310/326 |
| 4,755,706 | 7/1988 | Harnden, Jr. et al. | 310/332 |

FOREIGN PATENT DOCUMENTS

| | | |
|---|---|---|
| 300312 | 8/1980 | Germany. |
| 141680 | 11/1979 | Japan ............... 340/566 |
| 2026284 | 1/1980 | United Kingdom. |
| 89/00294 | 1/1989 | WIPO. |

OTHER PUBLICATIONS

Philips Components Catalog, "Piezokeramik" (Philips AG Components 1990/91, pp. 15.9, 15.19 and 15.20.

*Primary Examiner*—Thomas Mullen
*Attorney, Agent, or Firm*—Burns, Doane, Swecker & Mathis, LLP

[57] ABSTRACT

The detector contains a structure-borne sound microphone connected to an electronic evaluation unit with a piezoelectric sensor (18) for structure-borne sound vibrations. This sensor has a vibrating bar (28), which is attached by means of hybrid technology to a carrier (27). The vibrating bar (28) is formed by a bimorph element and the carrier by an electrically conductive ceramic wafer.

12 Claims, 1 Drawing Sheet

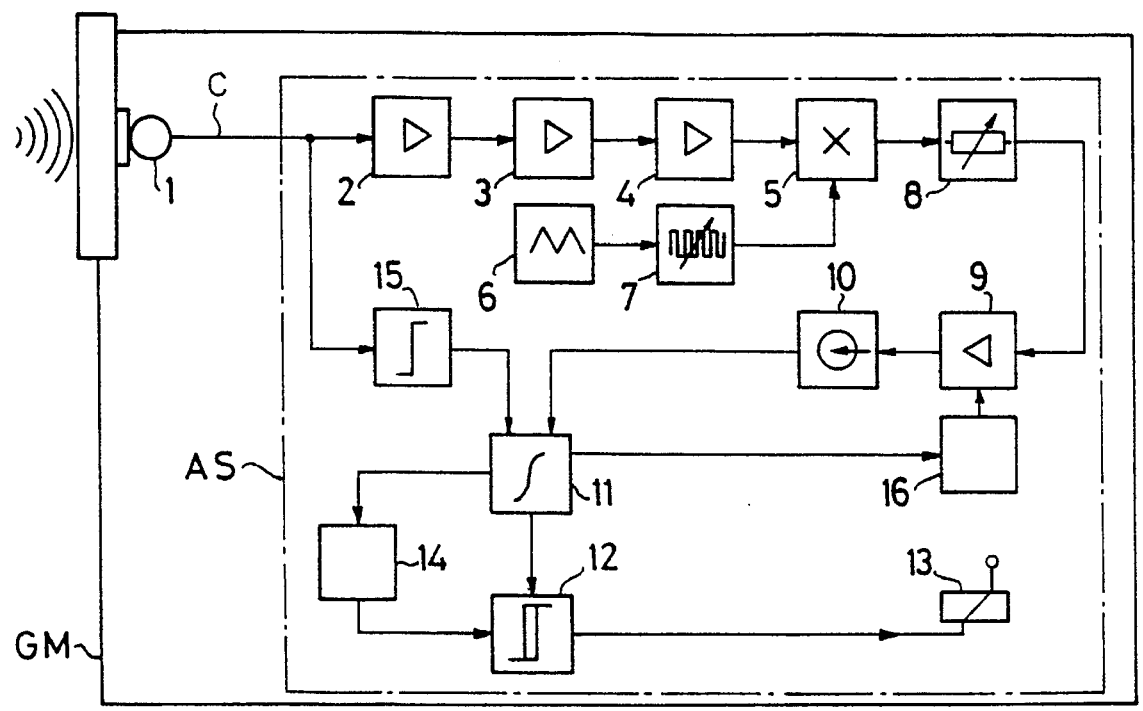
FIG. 1
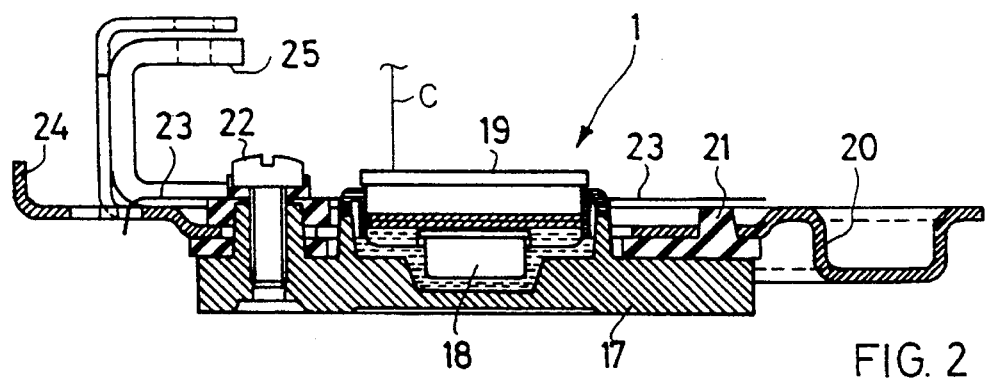
FIG. 2
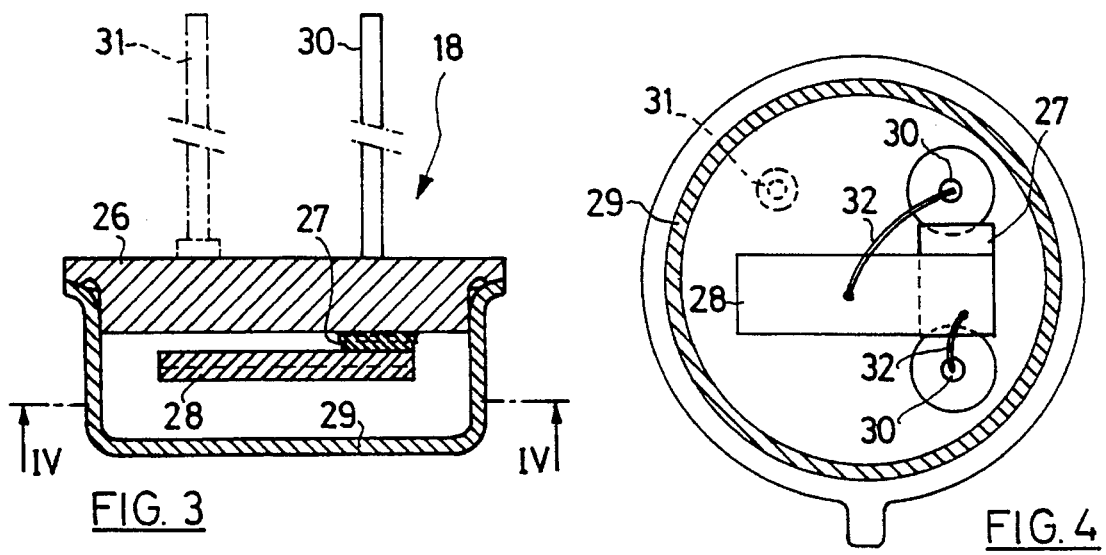
FIG. 3
FIG. 4

STRUCTURE-BORNE SOUND DETECTOR FOR AN INTRUDER ALARM SYSTEM

BACKGROUND AND SUMMARY

The present invention relates to a structure-borne sound detector for an intruder alarm system, with a structure-borne sound microphone, which has a piezoelectric sensor for structure-borne sound vibrations and for converting these into electrical signals, connected to, an electronic evaluation unit.

These structure-borne sound detectors, also described as noise detectors, are used to detect attacks on protective objects made of steel or concrete and on safes with plastic-reinforced protective coatings. The detectors are deployed in particular to monitor vault walls and doors, safes and automatic teller machines. Their mode of operation is based on the fact that when hard materials such as concrete or metal, for example, are disturbed, mass accelerations arise, due to which mechanical vibrations are generated, which disperse in the material as structure-borne sound. The piezoelectric sensor picks up these vibrations and converts them into electrical signals. The detector electronics evaluate the signals and trigger an alarm in the event of an appropriate evaluation result.

In all structure,borne sound detectors known today, the sensor is formed by a piezoelectric wafer, which is glued to its carrier. Due to this, the sensitivity of the microphone is influenced primarily by external parameters such as contact pressure, the thickness and quality of the layer of adhesive, by the surrounding mechanical components and the like. This has the consequence that each individual detector has to be adjusted, which increases production costs by a considerable amount.

A second consequence of the dependence of the microphone on external parameters consists in the fact that the transfer function of the microphone, i.e. the pick-up and transmission of the structure-borne sound, is not controllable or reproducible. Added to this is the fact that the resonance frequency and sensitivity of the structure-borne sound microphone is influenced very considerably by the metal flange forming part of the sensor casing.

The known structure-borne sound detectors are now to be improved by the invention in such a way that the sensitivity Of the microphone depends primarily on nothing but the sensor characteristic and no longer on external parameters, and thus no further trimming or adjustment is required. The transfer function of the microphone should also be reproducible and controllable.

The problem set is solved according to the invention in that the piezoelectric sensor contains a defined vibrating bar, which is formed by a bimorph element and attached by means of hybrid technology to a conductive carrier.

The sensor according to the invention has the principal advantage that the resonance frequency of the vibrating bar depends almost exclusively on its dimensions and only to a very small extent on the flange supporting the microphone. The sensitivity and resonance frequency of the microphone are thereby dependent exclusively on the sensor characteristic and no longer on external parameters, owing to which no further adjustment is necessary and production is accordingly simplified and reduced in cost.

Bimorph elements suitable for use in the invention, are described in the Philips Catalog "Piezokeramik" (Philips AG Components 1990/91) at pages 15.9, 15.19 and 15.20. Such bimorph elements consist of two thin wafers of piezoceramic material (denoted PXE wafers) joined together as a unit operable in an oscillation mode (e.g. longitudinal oscillation with transversal excitation). In a serial bimorph the PXE laminas are switched in series with the supply source, whereas, in a parallel bimorph each PXE lamina is driven by the supply source. In a serial bimorph one of the laminas is operated with a voltage acting in the opposite direction to the polarization voltage which increases the danger of depolarization. This may apply to a parallel bimorph also, but the latter can also be driven in another way. In this case both laminas are operated in the direction of polarization and, in this way, changes of the material characteristics by depolarization effects are avoided.

For serial bimorphs, the lamina with the highest R has the highest voltage and can depolarize when a voltage is acting in the opposite direction. For parallel bimorphs, both laminas have the same voltage, and depolarization is independent of the resistance. For actuator applications, parallel bimorphs are normally the most suitable ones. Serial bimorphs advantageously should be used in sensor applications.

The formation of the vibrating bar from a bimorph element has the advantage of creating a precisely reproducible connection between the bimorph element and the conductive carrier, due to which the manufacturing costs of the sensor are further reduced.

The conductive carrier for its part is attached to a base, preferably to a transistor header, so that an electrical connection exists between this and the lower part of the bimorph element.

BRIEF DESCRIPTION OF THE DRAWING FIGURES

The invention is explained in greater detail below with reference to a practical example and the drawings.

FIG. 1 shows a block diagram of a structure-borne sound detector,

FIG. 2 shows a cross section through a part of the detector containing the microphone, FIG. 3 shows a detail of the microphone in FIG. 2; and FIG. 4 shows a cross section according to the line IV—IV in FIG. 3.

DETAILED DESCRIPTION

The noise detector GM shown in FIG. 1 contains according to the representation a microphone 1 acting as a structure-borne sound pick-up and an evaluation circuit AS. The microphone 1 is used to pick up the vibrations which are generated by the mass accelerations produced when hard materials are disturbed, and to convert these vibrations into electrical signals. The evaluation circuit AS is known from U.S. Pat. No. 4,290,058, for example, and is only to be described briefly here. The output signal of the microphone 1 is supplied via an impedance converter 2 to a preamplifier 3. The preamplified signal passes via a further amplifier 4 to a mixer 5, where the amplified signal is mixed with the signal of an oscillator 7 swept by a slow-running sweep oscillator 6. The product of the signal mix is supplied via a sensitivity controller 8 to an intermediate-frequency amplifier 9. The amplified IF signal acts on a voltage-controlled power source 10, which charges an integration capacitor 11. As soon as the voltage at the! integration capacitor 11 surpasses the threshold of an alarm comparator 12, an alarm is triggered by the drop-out of an alarm relay 13.

The alarm comparator is wired as a Schmitt trigger. The switching thresholds are selected such that in the event of an alarm due to the discharging of the integration capacitor 11 via the discharging network 14, the alarm self-holding time is around 1s. In the event of strong impacts or an explosion, a trigger circuit 15 is activated, which charges the integration capacitor 11 within a short time and causes an alarm to be triggered. If the time interval between two consecutive noises is greater than approximately 5s, then the integration capacitor 11 is swiftly discharged via a stage 16.

FIG. 2 shows an axial section through the microphone 1 of the noise detector GM in FIG. 1. This consists in the representation of a microphone flange 17, which is screwed to the object to be protected, to be precise so that it fits closely to the object with its bottom surface in the figure. A sensor 18 is encapsulated or glued into the microphone flange 17. The sensor 18 is sealed at the top by a lid 19, which is likewise glued to the microphone flange 17 and has a terminal contact (C) to the electronic evaluation unit AS (FIG. 1). Placed onto the microphone flange 17 is a mounting plate 20, which is cushioned from the microphone flange 17 by rubber inserts 21. The mounting plate 20 is connected to the microphone flange by screws 22. A shim 23, which lies on the mounting plate 20 and is penetrated by the screws 22, prevents the microphone flange 17 from falling out of the mounting plate 20.

The mounting plate 20 is provided with a fastening web 24 for the electronic evaluation unit AS, which is held in a swivelling plastic lid. The mounting plate 20 also has fixing brackets 25 for a solid casing lid, which is secured by a sabotage switch against unauthorized interference. The plastic lid for the electronic evaluation unit AS, the casing lid and the sabotage switch are not essential to the invention and are therefore not shown.

The sensor 18 of the microphone 1 is shown in

FIGS. 3 and 4. FIG. 3 shows an axial section and

FIG. 4 a cross-section according to the line IV—IV in

FIG. 3. The sensor 18 consists in the representation of a transistor header 26 and a small conductive carrier plate 27 attached to the transistor header 26. A piezoelectric Vibrating bar 28 is attached to the plate 27, and a covering cap 29 covers the structure. The sensor includes three terminals 30 and 31, of which the two terminals 30 are routed to the terminal contact in the lid 19 (FIG. 2) and the terminal 31 drawn in as a dotted and dashed line is used for grounding purposes.

The carrier plate 27 is used to create a space between the vibrating bar 28 and the transistor header 26 so that the vibrating bar 28 can vibrate freely. The carrier plate 27 also forms an electrical connection between the lower part of the vibrating bar 28 and the transistor header 26. Ceramic is preferably used as the material for the carrier plate 27; however, the carrier plate 27 may also be formed by a metal base.

The vibrating bar 28 is formed by a so-called bimorph element, which according to the Philips piezoceramic component catalogue is two thin PXE wafers joined together to form a unit. Bimorph elements are operated in series or parallel, series operation of the PXE Wafers being recommended for sensor applications.

The vibrating bar 28, which is from 1 mm to 7 mm in length (e.g. 5.33 mm), has a rectangular cross-section of 1.5 by 0.5 mm, which provides a cross-sectional area of less than 1 mm$^2$ (e.g., 0.75 mm$^2$). The resonance frequency of the vibrating bar 28 lies in the range from roughly 12 to 22 kHz. The vibrating bar 28 is gold-plated like the carrier plate 27 and is bonded to the carrier plate 27 using hybrid technology.

Hybrid technology circuit integration is used to interconnect multi-chip modules, and includes attaching several integrated chips on a common support or carrier, and then bonding the chips together, which saves space and reduces noise and interferences. The semiconductor chips may be glued, soldered or wire-bonded. Bonding in turn describes the creation of electrical connections within semiconductor components by means of thin gold wires. Because the bimorph elements fit exactly on the carrier, and because this type of procedure is done with the aid of a microscope, hybrid technology advantageously provides for improved precision and accuracy in assembling the vibrating bar 28 to the carrier plate 27.

The thin wires which form the connection between the vibrating bar 28 and the two contacts 30 are described in FIG. 4 by the reference symbol 32. They consist of gold and have a diameter of 25 μm. As shown in the figure, two bond wires 32 are provided on the same side of the vibrating bar 28, making it possible to detect fracturing of the vibrating bar 28 as a result of explosion or hard impact.

If the carrier plate 27 is formed by a ceramic wafer, then both the transistor header 26 and this ceramic wafer, and the ceramic wafer and the vibrating bar 28, are glued together using electrically conductive epoxy resin, so that the lower part of the vibrating bar 28 is electrically connected to the transistor header 26. Structure-borne sound received by the microphone 1 is transmitted by the transistor header 26 to the acoustically hard-coupled vibrating bar 28 and excites the vibrating bar 28. The electrical signal obtainable at the output of the sensor 18 provides information regarding the nature and intensity of this excitation.

The structure-borne sound detector-according to the invention is not restricted to the practical example described, in particular, the invention is not restricted to the electronic evaluation unit AS shown in FIG. 1 and is not restricted to the microphone 1 shown in FIG. 2. At least two features of the piezoelectric sensor are important to the invention: on the one hand, the use of a precisely defined sensor in the form of a vibrating bar and the manufacture and assembly of this in hybrid technology, and on the other hand, the use of a bimorph element as a vibrating bar.

What is claimed is:

1. A structure-borne sound detector for an intruder alarm system, with a structure-borne sound microphone, said microphone including a piezoelectric sensor for sensing structure-borne sound vibrations and for converting these vibrations into electrical signals, wherein said sensor is connected to an electronic evaluation unit, wherein the piezoelectric sensor contains a vibrating bar which is formed by a bimorph element and is attached by hybrid technology to a conductive spacer member carrier.

2. A structure-borne sound detector according to claim 1, wherein the conductive carrier is formed by a metal base.

3. A structure-borne sound detector according to claim 1, wherein the conductive carrier is formed by a ceramic wafer.

4. A structure-borne sound detector according to claim 3, wherein the vibrating bar and the ceramic wafer are gold-plated, and the ceramic wafer is bonded directly onto the vibrating bar.

5. A structure-borne sound detector according to claim 4, wherein the ceramic wafer is supported by a transistor header and the ceramic wafer is glued to the transistor header with conductive epoxy resin.

6. A structure-borne sound detector according to claim 4, wherein two bond wires are provided on the same side of the vibrating bar.

7. A structure-borne sound detector according to claim 1, wherein the vibrating bar (28) is 1 to 7 mm in length and has a cross-section area of less than 1 mm².

8. A structure-borne sound detector according to claim 7, wherein the vibrating bar is about 5 mm in length.

9. A structure-borne sound detector according to claim 1, wherein said evaluation unit comprises means for receiving said electrical signals from said microphone and evaluating said electrical signals to determine whether an alarm should be generated.

10. A sensor for sensing vibrations, including:

a bimorph bar member which vibrates when disturbed;

a carrier member affixed to one end of said bar member;

a header member, onto which said carrier member is secured;

at least two wires bonded to said bar member carrying information indicating the nature and intensity of vibrations experienced by said bar member.

11. The sensor of claim 10, wherein said bar-like member, said carrier member and said header member are assembled using hybrid technology techniques to form a hybrid component.

12. The sensor of claim 10, wherein said at least two wires are bonded to a same side of said bar member.

* * * * *